(12) United States Patent
Tanoue

(10) Patent No.: US 12,055,733 B2
(45) Date of Patent: Aug. 6, 2024

(54) LIGHT GUIDE PLATE, DISPLAY DEVICE, INPUT DEVICE, AND APPARATUS INCLUDING DISPLAY DEVICE

(71) Applicant: OMRON Corporation, Kyoto (JP)

(72) Inventor: Yasuhiro Tanoue, Kyoto (JP)

(73) Assignee: OMRON CORPORATION, Kyoto (JP)

( * ) Notice: Subject to any disclaimer, the term of this patent is extended or adjusted under 35 U.S.C. 154(b) by 114 days.

(21) Appl. No.: 17/673,843

(22) Filed: Feb. 17, 2022

(65) Prior Publication Data

US 2022/0291519 A1 Sep. 15, 2022

(30) Foreign Application Priority Data

Mar. 12, 2021 (JP) .................................. 2021-40788

(51) Int. Cl.
  *G02B 30/22* (2020.01)
  *F21V 8/00* (2006.01)
  *G06F 1/16* (2006.01)
(52) U.S. Cl.
  CPC ........... *G02B 30/22* (2020.01); *G02B 6/0055* (2013.01); *G06F 1/1684* (2013.01)
(58) Field of Classification Search
  CPC ...... G02B 30/22; G02B 6/0055; G06F 1/1684
  See application file for complete search history.

(56) References Cited

U.S. PATENT DOCUMENTS

| 2011/0227487 A1* | 9/2011 | Nichol ................. G02B 6/0018 362/613 |
| 2019/0179161 A1* | 6/2019 | Shinohara .............. G03B 35/18 |
| 2020/0371377 A1 | 11/2020 | Takagi et al. |

FOREIGN PATENT DOCUMENTS

| CN | 109313349 A | 2/2019 |
| JP | 2018-10223 A | 1/2018 |
| JP | 2020144282 A | 9/2020 |
| WO | 2019159622 A1 | 8/2019 |

OTHER PUBLICATIONS

Office Action issued on Feb. 5, 2024, in a counterpart Chinese patent application.

* cited by examiner

*Primary Examiner* — Abdulmajeed Aziz
*Assistant Examiner* — Jessica M Apenteng
(74) *Attorney, Agent, or Firm* — METROLEX IP LAW GROUP, PLLC; Robert L. Scott, Esq.

(57) ABSTRACT

A light guide plate according to one or more embodiments may include a first optical deflector that guides light to be emitted within a first angle range to display a stereoscopic image in a space, and a second optical deflector that guides light to be emitted within a second angle range to display a stereoscopic image at a same position as the stereoscopic image. Across a boundary between the first angle range and the second angle range, a discrete change occurs between luminance of a portion of the stereoscopic image and luminance of a portion of the stereoscopic image corresponding to the portion of the stereoscopic image.

20 Claims, 9 Drawing Sheets

LIGHT GUIDE PLATE, DISPLAY DEVICE, INPUT DEVICE, AND APPARATUS INCLUDING DISPLAY DEVICE

CROSS-REFERENCE TO RELATED APPLICATION

This application claims priority to Japanese Patent Application No. 2021-040788 filed on Mar. 12, 2021, the contents of which are incorporated herein by reference.

FIELD

The disclosure relates to, for example, a light guide plate for displaying a stereoscopic image.

BACKGROUND

A related light guide plate and a related optical device for displaying a stereoscopic image are described in, for example, Patent Literature 1. The optical device described in Patent Literature 1 includes a plane imager and a contour imager. The plane imager emits light to form a plane image in a predetermined shape in a space. The contour imager emits light to form a contour image having a light intensity different from the light intensity of the plane image in an outer edge region of the plane image.

The optical device emits light to form, with the plane imager, a plane image in a predetermined shape in a space, and to form, with the contour imager, a contour image having a light intensity different from the light intensity of the plane image in the outer edge region of the plane image. Although the plane image alone may have a blurred boundary, the contour image having a light intensity different from the light intensity of the plane image is formed at the boundary. The plane image then appears stereoscopic. The optical device thus allows an image to be viewed more stereoscopic.

CITATION LIST

Patent Literature

Patent Literature 1: Japanese Unexamined Patent Application Publication No. 2018-010223

SUMMARY

The related optical device may be improved as described below.

For example, diamonds appear sparkling because different portions of a diamond sparkle or have higher luminance levels when the diamond is viewed in different directions.

One or more embodiments are directed to a technique including a light guide plate that may allow a stereoscopic image to appear properly.

A light guide plate according to one or more embodiments may include a first optical deflector that guides incident light to be emitted within a first angle range to display a first stereoscopic image representing an object as a real image or a virtual image in a space, and a second optical deflector that guides incident light to be emitted within a second angle range adjacent to the first angle range to display a second stereoscopic image representing the object at a same position as the first stereoscopic image. Across a boundary between the first angle range and the second angle range, a discrete change occurs between luminance of a portion of the first stereoscopic image and luminance of a portion of the second stereoscopic image corresponding to the portion of the first stereoscopic image.

In one or more embodiments, when the direction in which a user views the light guide plate changes from the first angle range to the second angle range, a stereoscopic image viewed by the user may change from the first stereoscopic image to the second stereoscopic image. A discrete change then occurs between the luminance of a portion of the first stereoscopic image and the luminance of a portion of the second stereoscopic image corresponding to the portion of the first stereoscopic image. The luminance of a portion of a stereoscopic image may thus be changed in accordance with the user's viewing direction, which may allow the stereoscopic image to appear properly.

The first angle range and the second angle range may be determined relative to a point on the object appearing in a space.

In a light guide plate according to one or more embodiments, across the boundary between the first angle range and the second angle range, a discrete change may occur between luminance of a first surface in the first stereoscopic image and luminance of a second surface in the second stereoscopic image corresponding to the first surface in the first stereoscopic image.

In a light guide plate according to one or more embodiments, across the boundary between the first angle range and the second angle range, a discrete change may occur between luminance of a first line in the first stereoscopic image and luminance of a second line in the second stereoscopic image corresponding to the first line in the first stereoscopic image.

A light guide plate according to one or more embodiments may further include a plurality of third optical deflectors that guide incident light to be emitted within a third angle range adjacent to the second angle range to display a third stereoscopic image representing the object at a same position as the first stereoscopic image. Across a boundary between the second angle range and the third angle range, a discrete change may occur between luminance of a portion of the second stereoscopic image and luminance of a portion of the third stereoscopic image corresponding to the portion of the second stereoscopic image. The second angle range may be greater than or equal to 5°.

The above described structure may reduce the likelihood of the user's right eye and left eye viewing different stereoscopic images.

A light guide plate according to one or more embodiments may further include a plurality of third optical deflectors that guide incident light to be emitted within a third angle range adjacent to the second angle range to display a third stereoscopic image representing the object at a same position as the first stereoscopic image. Across a boundary between the second angle range and the third angle range, a discrete change may occur between luminance of a portion of the second stereoscopic image and luminance of a portion of the third stereoscopic image corresponding to the portion of the second stereoscopic image. The second angle range may be less than or equal to 15°.

One or more embodiments may reduce the likelihood that the stereoscopic image does not change unless the user greatly changes the direction in which the user views the light guide plate.

A light guide plate according to one or more embodiments may include a first optical deflector that guides incident first light to be emitted to display a first stereoscopic image representing an object as a real image or a virtual image in a space, and a second optical deflector that guides second light incident at a position different from a position at which the first light is incident to be emitted to display a second stereoscopic image representing the object at a same position as the first stereoscopic image. Upon switching between the first light and the second light, a discrete change may occur between luminance of a portion of the first stereoscopic image and luminance of a portion of the second stereoscopic image corresponding to the portion of the first stereoscopic image.

In one or more embodiments, when incident light changes from the first light to the second light, a stereoscopic image viewed by the user changes from the first stereoscopic image to the second stereoscopic image. A discrete change then occurs between the luminance of a portion of the first stereoscopic image and the luminance of a portion of the second stereoscopic image corresponding to the portion of the first stereoscopic image. The luminance of a portion of the stereoscopic image may thus be changed, which may allow the stereoscopic image to appear properly.

In a light guide plate according to one or more embodiments, the first optical deflector may cause the first light to be emitted within a first angle range to display a first stereoscopic image in a space and may cause the first light to be emitted within a second angle range adjacent to the first angle range to display a third stereoscopic image representing the object at a same position as the first stereoscopic image. The second optical deflector may cause the second light to be emitted within a third angle range to display a second stereoscopic image in a space and may cause the second light to be emitted within a fourth angle range adjacent to the third angle range to display a fourth stereoscopic image representing the object at a same position as the second stereoscopic image. Across a boundary between the first angle range and the second angle range, a discrete change may occur between luminance of a portion of the first stereoscopic image and luminance of a portion of the third stereoscopic image corresponding to the portion of the first stereoscopic image, and across a boundary between the third angle range and the fourth angle range, a discrete change may occur between luminance of a portion of the second stereoscopic image and luminance of a portion of the fourth stereoscopic image corresponding to the portion of the second stereoscopic image.

For the first light being incident light, when the direction in which the user views the light guide plate changes from the first angle range to the second angle range, a stereoscopic image viewed by the user changes from the first stereoscopic image to the third stereoscopic image. A discrete change then occurs between the luminance of a portion of the first stereoscopic image and the luminance of a portion of the third stereoscopic image corresponding to the portion of the first stereoscopic image. For the second light being incident light, when the direction in which the user views the light guide plate changes from the third angle range to the fourth angle range, a stereoscopic image viewed by the user changes from the second stereoscopic image to the fourth stereoscopic image. A discrete change then occurs between the luminance of a portion of the second stereoscopic image and the luminance of a portion of the fourth stereoscopic image corresponding to the portion of the second stereoscopic image. The luminance of a portion of the stereoscopic image may be changed in accordance with the user's viewing direction in multiple modes that may be switched.

A display device according to one or more embodiments may include the light guide plate according to any one of the above aspects, and a light source that emits light to be incident on the light guide plate.

An input device according to one or more embodiments may include the above display device, and a sensor that detects an object.

An apparatus according to one or more embodiments may include the above display device.

A display device, an input device, and an apparatus according to one or more embodiments with the above structure may display a stereoscopic image with improved tone representation in a space.

The technique including the light guide plate according to one or more embodiments may allow a stereoscopic image to appear properly.

DETAILED DESCRIPTION

One or more embodiments will now be described with reference to the drawings.

First Embodiment

One or more embodiments will now be described with reference to, for example, FIG. 1.

Structure of Optical Device

Figure 1:
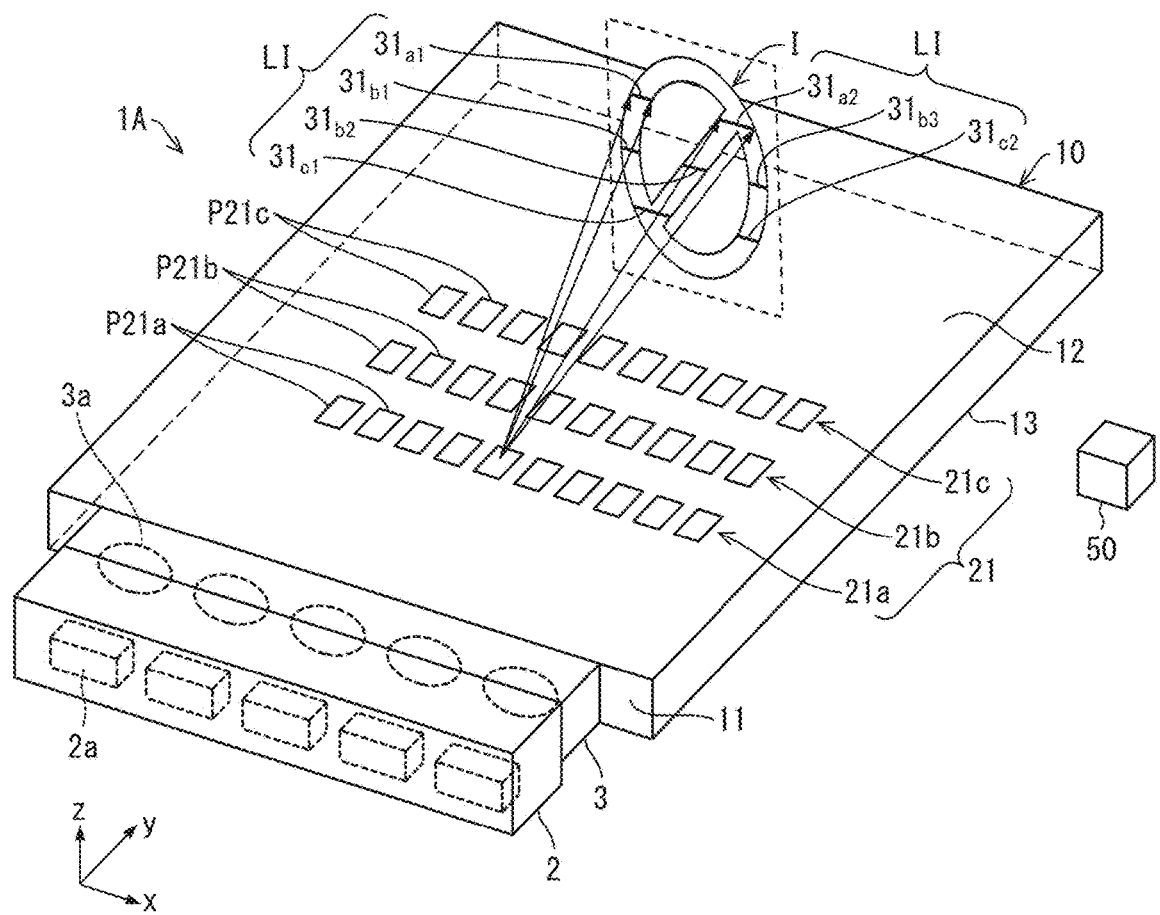
FIG. 1 is a diagram illustrating a perspective view of an optical device according to one or more embodiments.
Figure 2:
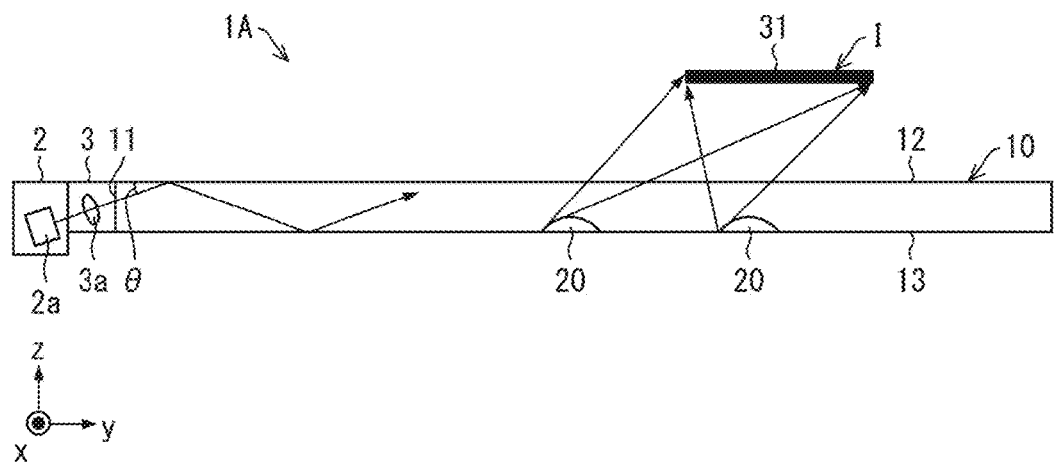
FIG. 2 is a diagram illustrating a cross-sectional view of an optical device according to one or more embodiments.

FIG. 1 is a perspective view of an optical device 1A. FIG. 2 is a cross-sectional view of the optical device 1A. The structure of the optical device 1A according to the present embodiment or embodiments will now be described with reference to FIGS. 1 and 2.

As shown in FIG. 1, the optical device 1A includes a light source 2, a light guide plate 10 that guides incident light from the light source 2 to be emitted through an emission surface 12, and multiple optical path deflectors 21 (multiple cells) arranged on the light guide plate 10. The multiple optical path deflectors 21 include multiple optical path deflector sets 21a, 21b, 21c, . . . (multiple deflectors) to deflect guided light to be emitted to form a stereoscopic image I in a space.

The light source 2 includes multiple light-emitting diodes (LEDs) 2a. Light emitted from the LEDs 2a is adjusted by an incident light adjuster 3 and then enters the light guide plate 10 through an incident surface 11. Although the light source 2 includes multiple LEDs in the present embodiment or embodiments, the light source 2 may include a single LED.

The incident light adjuster 3 includes multiple lenses 3a in a one-to-one correspondence with the LEDs 2a. Each lens 3a reduces, increases, or maintains the divergence of light in an xy plane (described later) in a direction along an optical axis of light emitted from the corresponding LED 2a. The lenses 3a thus cause light emitted from the LEDs 2a to be closer to parallel light or guide the light over the entire area within the light guide plate 10. The angle of divergence of light guided by the light guide plate 10 may be 5° or less, or specifically, less than 1°. As another component to reduce the divergence angle of light in the xy plane within the light guide plate 10, for example, the incident light adjuster 3 may include a mask with openings each having a width narrower than a predetermined width in x-direction.

In the present embodiment or embodiments, light emitted from the LEDs 2a has an optical axis extending at an angle θ with respect to the emission surface 12 as shown in FIG. 2. For example, the angle θ, or a narrow angle formed by the optical axis of light emitted from the LEDs 2a and the emission surface 12, is about 20°. Thus, when light incident on the light guide plate 10 is close to parallel light, more light is guided within the light guide plate 10 while being repeatedly reflected by the emission surface 12 and a rear surface 13 than for incident light with an optical axis extending parallel to y-axis, which allows more light to enter the optical path deflectors 20 than for incident light with an optical axis extending parallel to y-axis.

The light guide plate 10 is formed from a transparent resin material with a relatively high refractive index. The material for the light guide plate 10 may be a polycarbonate (PC) resin, a polymethyl methacrylate (PMMA) resin, or glass.

The light guide plate 10 has the incident surface 11 that receives light from the light source 2, the emission surface 12 being a front surface of the light guide plate 10 through which light is emitted, and the rear surface 13 with the optical path deflectors 21.

In the present embodiment or embodiments, light is emitted through the emission surface 12 of the light guide plate 10. The emitted light forms a stereoscopic image I in a space. The stereoscopic image I appears stereoscopic to a viewer. The stereoscopic image I refers to an image that appears stereoscopic at a position other than on the emission surface 12 of the light guide plate 10. The stereoscopic image I may be, for example, a two-dimensional image that appears at a position away from the emission surface 12 of the light guide plate 10. More specifically, the stereoscopic image I may be an image that appears stereoscopic, or may be an image having a two-dimensional shape that appears at a position other than on the optical device 1A. Although the stereoscopic image I is a real image located in the positive z-direction with respect to the emission surface 12 in the present embodiment or embodiments, the stereoscopic image I may be a virtual image located in the negative z-direction with respect to the emission surface 12.

In the present embodiment or embodiments, an orthogonal coordinate system including x-axis, y-axis, and z-axis may be used. In the present embodiment or embodiments, z-direction is defined as a direction perpendicular to the emission surface 12, and the positive z-direction is defined as a direction from the rear surface 13 toward the emission surface 12. The y-direction is defined as a direction perpendicular to the incident surface 11, and the positive y-direction is defined as a direction in which light travels within the light guide plate 10. The x-axis is defined as a direction perpendicular to y-axis and z-axis, and the positive x-direction is defined as a direction from the left side toward the right side in FIG. 1. A plane parallel to an xy plane may be referred to as the xy plane, a plane parallel to a yz plane may be referred to as the yz plane, and a plane parallel to an xz plane may be referred to as the xz plane.

The light guide plate 10 has, on the rear surface 13, the multiple optical path deflectors 21 that deflect light guided within the light guide plate 10 to be emitted to form a stereoscopic image I as an image in a space. The multiple optical path deflectors 21 are two-dimensionally arranged at different positions, for example, in a matrix in the xy plane. The optical path deflectors 21 may be, for example, prisms.

In FIG. 2, light emitted from the light source 2 enters the light guide plate 10 through the incident surface 11 after passing through the incident light adjuster 3. The light that has entered the light guide plate 10 is guided while being totally internally reflected between the emission surface 12 and the rear surface 13. The optical path deflectors 21 then disrupt the total internal reflection conditions to deflect the light in specific directions. The light is then emitted through the emission surface 12.

The structure and the function of the optical path deflectors 21 will now be described.

Figure 3:
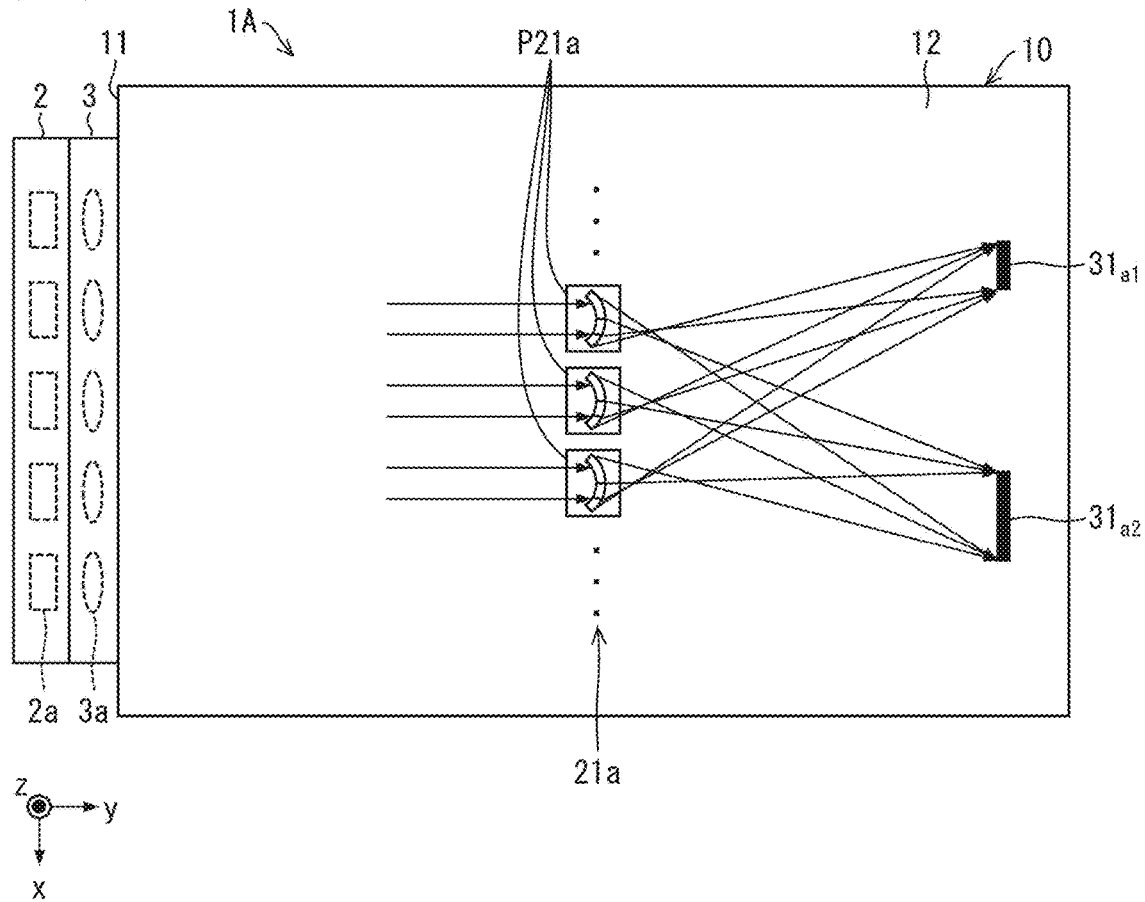
FIG. 3 is a diagram illustrating a plan view of an optical device according to one or more embodiments showing a portion for forming a stereoscopic image.
Figure 4:
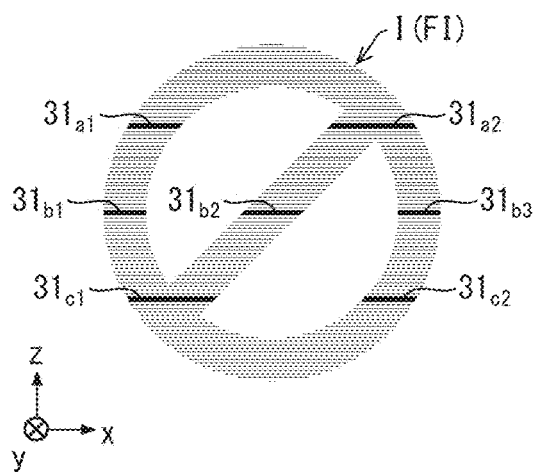
FIG. 4 is a diagram illustrating a front view of an example stereoscopic image formed by an optical device according to one or more embodiments.

The structure of the optical device 1A for forming a stereoscopic image I will now be described with reference to FIGS. 1, 3, and 4. FIG. 3 is a plan view of the optical device 1A showing a portion for forming a stereoscopic image I. FIG. 4 is a front view of an example stereoscopic image I formed by the optical device 1A.

As shown in FIG. 1, for example, the optical device 1A forms, as a stereoscopic image I, an image of a ring with a diagonal line inside that is a plane image FI on a stereoscopic imaging plane parallel to the xz plane (FIG. 4).

In the optical device 1A, light propagating within the light guide plate 10 may have a wide divergence in the yz plane. Thus, the incident light adjuster 3 does not reduce the divergence angle of light from the light source 2 in the yz plane. In other words, the divergence angle of light from the light source 2 in the yz plane is substantially unaffected by the incident light adjuster 3.

For example, the lenses 3a in the incident light adjuster 3 may be convex cylindrical lenses having a curvature in the xy plane and having substantially no curvature in the yz plane. The cylindrical lenses are, for example, biconvex.

The light guide plate 10 includes, on the rear surface 13, the multiple optical path deflector sets 21a, 21b, 21c, . . . that function as the optical path deflectors 21. Each of the optical path deflector sets 21a, 21b, 21c, . . . includes multiple prisms arranged in a direction parallel to x-axis. For example, the optical path deflector set $21a$ includes multiple prisms P$21a$. Similarly, the optical path deflector set $21b$ includes multiple prisms P$21b$. The optical path deflector set $21c$ includes multiple prisms P$21c$.

For example, the prisms P$21a$ deflect incident light to be spread in a direction parallel to the xy plane. The light is then emitted through the emission surface 12. Light beams emitted through the prisms P$21a$ through the emission surface 12 intersect with the stereoscopic imaging plane substantially at lines. As shown in FIGS. 1 and 3, each prism P$21a$ causes two light beams to be emitted through the emission surface 12. The emitted two light beams intersect with the stereoscopic imaging plane at a line $31_{a1}$ and a line $31_{a2}$. As shown in FIG. 1, each prism P$21a$ included in the optical path deflector set $21a$ causes light beams to be emitted through the emission surface 12. The light beams intersect with the stereoscopic imaging plane at the line $31_{a1}$ and the line $31_{a2}$. The line $31_{a1}$ and the line $31_{a2}$ are in a plane substantially parallel to the xy plane to form a part of the stereoscopic image I. In the above described manner, light from the prisms P$21a$ in the optical path deflector set $21a$ forms line images LI corresponding to the line $31_{a1}$ and the line $31_{a2}$. The light forming the images of the line $31_{a1}$ and the line $31_{a2}$ may be provided by at least two of the prisms P$21a$ in the optical path deflector set $21a$ arranged at different positions in x-direction.

Each prism P$21a$ in the optical path deflector set $21a$ causes incident light to be spread in x-direction in a plane parallel to the emission surface 12 to cause the light to have an intensity distribution corresponding to the images of the line $31_{a1}$ and the line $31_{a2}$. The prism P$21a$ then causes the light to be emitted through the emission surface 12. The light from the prisms P$21a$ in the optical path deflector set $21a$ arranged in x-direction thus forms the images of the line $31_{a1}$ and the line $31_{a2}$.

Similarly, as shown in FIG. 1, each prism P$21b$ in the optical path deflector set $21b$ deflects incident light to be spread in a direction parallel to the xy plane. The prism P$21b$ then causes three light beams to be emitted through the emission surface 12. The three light beams emitted through the emission surface 12 intersect with the stereoscopic imaging plane at a line $31_{b1}$, a line $31_{b2}$, and a line $31_{b3}$. Each prism P$21b$ included in the optical path deflector set $21b$ causes light beams to be emitted through the emission surface 12. The light beams intersect with the stereoscopic imaging plane at the lines $31_{b1}$, $31_{b2}$, and $31_{b3}$. In the above described manner, each prism P$21b$ in the optical path deflector set $21b$ deflects incident light to be spread in x-direction in a plane parallel to the emission surface 12 to have an intensity distribution corresponding to the images of the lines $31_{b1}$, $31_{b2}$, and $31_{b3}$. The prism P$21b$ then causes the light to be emitted through the emission surface 12. The light from the prisms P$21b$ in the optical path deflector set $21b$ arranged in x-direction thus forms the images of the lines $31_{b1}$, $31_{b2}$, and $31_{b3}$. The lines $31_{b1}$, $31_{b2}$, and $31_{b3}$ are in a plane substantially parallel to the xy plane to form a part of the stereoscopic image I.

The imaging positions of the lines $31_{b1}$, $31_{b2}$, and $31_{b3}$ and the imaging positions of the lines $31_{a1}$ and $31_{a2}$ are different from each other in z-direction in the stereoscopic imaging plane.

Similarly, as shown in FIG. 1, each prism P$21c$ in the optical path deflector set $21c$ deflects incident light to be spread in a direction parallel to the xy plane. The prism P$21c$ then causes two light beams to be emitted through the emission surface 12. The two light beams emitted through the emission surface 12 intersect with the stereoscopic imaging plane at a line $31_{c1}$ and a line $31_{c2}$. Each prism P$21c$ included in the optical path deflector set $21c$ causes light beams to be emitted through the emission surface 12. The light beams intersect with the stereoscopic imaging plane at the lines $31_{c1}$ and $31_{c2}$. In the above described manner, each prism P$21c$ in the optical path deflector set $21c$ causes incident light to be spread in x-direction in a plane parallel to the emission surface 12 to cause the light to have an intensity distribution corresponding to the images of the lines $31_{c1}$ and $31_{c2}$. The prism P$21c$ then causes the light to be emitted through the emission surface 12. The light from the prisms P$21c$ in the optical path deflector set $21c$ arranged in x-direction thus forms the images of the lines $31_{c1}$ and $31_{c2}$. The lines $31_{c1}$ and $31_{c2}$ are in a plane substantially parallel to the xy plane to form a part of the stereoscopic image I.

The imaging positions of the lines $31_{c1}$ and $31_{c2}$, the imaging positions of the lines $31_{b1}$, $31_{b2}$, and $31_{b3}$, and the imaging positions of the lines $31_{a1}$ and $31_{a2}$ are different from one another in z-direction in the stereoscopic imaging plane.

In FIG. 1, as described above, the lines $31_{c1}$ and $31_{c2}$, the lines $31_{b1}$, $31_{b2}$, and $31_{b3}$, and the lines $31_{a1}$ and $31_{a2}$ are imaged at positions different from one another in z-direction in the stereoscopic imaging plane, and are thus viewable as being separate from one another. In actual use, the optical path deflector sets $21a$, $21b$, and $21c$ are first optical path deflector sets including a greater number of the optical path deflector sets $21a$, $21b$, $21c$, . . . to allow the optical path deflector sets $21a$, $21b$, and $21c$ to be at shorter intervals in y-direction. In another embodiment or embodiments, when the optical path deflector sets $21a$, $21b$, and $21c$ are at longer intervals in y-direction, the optical deflection angles of the prisms P$21a$, P$21b$, and P$21c$ may be adjusted to cause the lines $31_{a1}$ and $31_{a2}$, the lines $31_{b1}$, $31_{b2}$, and $31_{b3}$, and the lines $31_{c1}$ and $31_{c2}$ to be imaged at positions closer to one another in z-direction. The plane image FI as an image of a ring with a diagonal line inside as the stereoscopic image I is thus viewable as shown in FIG. 4.

In the above described manner, the optical device 1A gathers light beams from the prisms P$21a$, P$21b$, P$21c$, . . . in the two-dimensionally arranged optical path deflector sets $21a$, $21b$, $21c$, . . . to cause the light beams to form the plane image FI in a space in which a viewer is located. The viewer can thus view the stereoscopic image I including the plane image FI from any position in a broad area extending in y-direction.

Shape of Optical Path Deflector Set

The shape of the prisms P$21a$, P$21b$, and P$21c$, . . . in the optical path deflector sets $21a$, $21b$, $21c$, . . . for forming the plane image FI will now be described with reference to FIG. 5.

Figure 5:
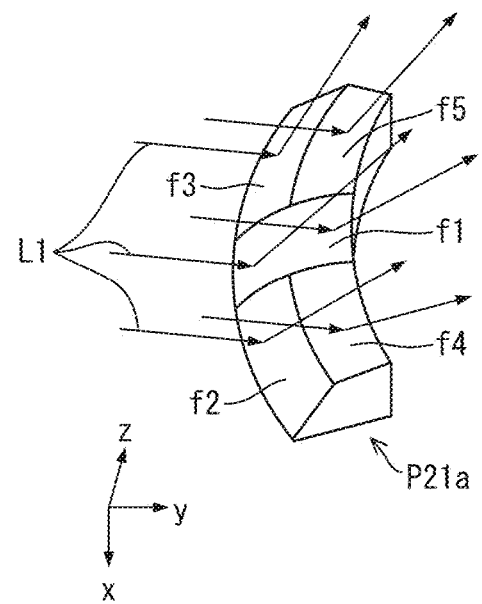
FIG. 5 is a diagram illustrating a perspective view of an example prism included in a light guide plate in an optical device according to one or more embodiments.

FIG. 5 is a perspective view of a prism P$21a$ included in the light guide plate 10 in the optical device 1A.

As shown in the figure, the prism P$21a$ in the optical path deflector set $21a$ is, for example, shaped substantially like a cutout from a ring with a trapezoidal cross section. The prism P$21a$ has reflective surfaces f1, f2, f3, f4, and f5. The reflective surfaces f1, f2, f3, f4, and f5 are example optical surfaces as deflection surfaces that deflect light. The reflective surfaces f1, f2, f3, f4, and f5 are curved surfaces facing in different directions. As described above, the LEDs $2a$ each have an optical axis inclined at an angle θ to the emission surface 12 of the light guide plate 10 in the yz plane. Thus, when light incident on the light guide plate 10 is close to parallel light, more light is guided within the light guide plate 10 while being repeatedly reflected by the emission surface 12 and the rear surface 13 than for incident light with an optical axis extending parallel to y-axis, which allows more light to be incident on the reflective surfaces f1, f2, f3, f4, and f5 than for incident light with an optical axis extending parallel to y-axis.

The reflective surface f1 is an upward slope curved in an arc in a direction parallel to light L1 guided within the light guide plate 10. The reflective surface f1 receives incident light L1 at a different angle from the emission surface 12 in accordance with the position of incidence on the reflective surface f1. Thus, the reflective surface f1 spreads the light L1 incident on the reflective surface f1 over, for example, a side 31 included in the stereoscopic image I as shown in FIG. 2. The side 31 is parallel to y-axis. Light reflected from the reflective surface f1 travels toward the side 31. Substantially no light from the reflective surface f1 travels in any direction other than toward the side 31. Thus, the light reflected from the reflective surface f1 is distributed, in the yz plane, at substantially angles alone in directions from the reflective surface f1 to the side 31. In the above described manner, the reflective surface f1 modulates the intensity of incident light in the angular direction and causes the light to be emitted in the yz plane. The curved reflective surface f1 allows the light L1 being parallel light incident on the reflective surface f1 to form a line in an image.

As shown in FIG. 5, the reflective surfaces f2 and f3 extend in an arc with the reflective surface f1 between them in the prism P21a shaped like a ring with a trapezoidal cross section. Similarly to the reflective surface f1, the reflective surfaces f2 and f3 each are a slope extending partway up the prism P21a. The reflective surfaces f2 and f3 thus reflect the light L1 incident on the reflective surfaces f2 and f3 to cause the reflected light to spread over the areas of the line $31_{a1}$ and the line $31_{a2}$ in the stereoscopic image I. As shown in FIG. 1, the reflective surface f1 causes no line to appear between the line $31_{a1}$ and the line $31_{a2}$ in the stereoscopic image I.

As shown in FIG. 5, the reflective surfaces f4 and f5 are upward slopes defined by inflection lines in the reflective surfaces f4 and f5. The reflective surfaces f4 and f5 allow, for example, the line $31_{c1}$ and the line $31_{c2}$ in the stereoscopic image I to be formed as shown in FIG. 1.

In the above described manner, the prism P21a shaped to have, for example, the reflective surfaces f1 to f5 allows the side 31, the lines $31_{a1}$ and $31_{a2}$, the lines $31_{b1}$, $31_{b2}$, and $31_{b3}$, and the lines $31_{c1}$ and $31_{c2}$ included in the plane image FI being the stereoscopic image I to be formed.

Example Use and Example Arrangement of Optical Path Deflector Sets

An example use and an example arrangement of the optical path deflector sets 21a, 21b, 21c, . . . will now be described with reference to FIG. 6.

Figure 6:
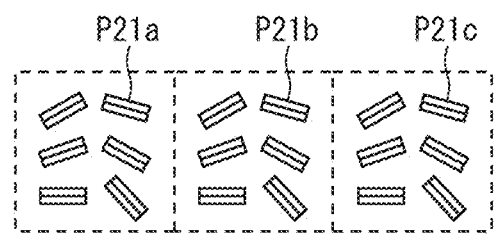
FIG. 6 is a diagram illustrating an example use and an example arrangement of optical path deflector sets according to one or more embodiments.

FIG. 6 is a diagram showing an example use and an example arrangement of the optical path deflector sets 21a, 21b, 21c, . . . . As shown in FIG. 6, for example, the optical path deflector sets 21a, 21b, and 21c include respective triangular prisms P21a, P21b, and P21c, each with one face corresponding to the bottom surface of the light guide plate 10. The prisms P21a, P21b, and P21c are arranged in a matrix with three rows and two columns with a slight clearance between one another. The above described structure is a mere example, and the optical path deflector sets 21a, 21b, and 21c may have any other structure. For example, the optical path deflector sets 21a, 21b, and 21c may include the respective triangular prisms P21a, P21b, and P21c arranged in a matrix with three rows and three columns.

Structure of Light Guide Plate Allowing Luminance Level to Change in Accordance with Viewing Direction The structure of the light guide plate 10 that allows the luminance level to change in accordance with the viewing direction will now be described in detail with reference to FIGS. 7 to 10. To change the luminance level, the density of dots expressing surfaces in the stereoscopic image I may be changed, or, for example, the length or height of the prisms arranged on the bottom surface of the light guide plate 10 may be changed.

Normally, a stereoscopic object appears to have different shapes in accordance with the direction in which the user views the object. Thus, the stereoscopic image I viewed by the user also appears to have different shapes in accordance with the viewing direction.

Figure 7:
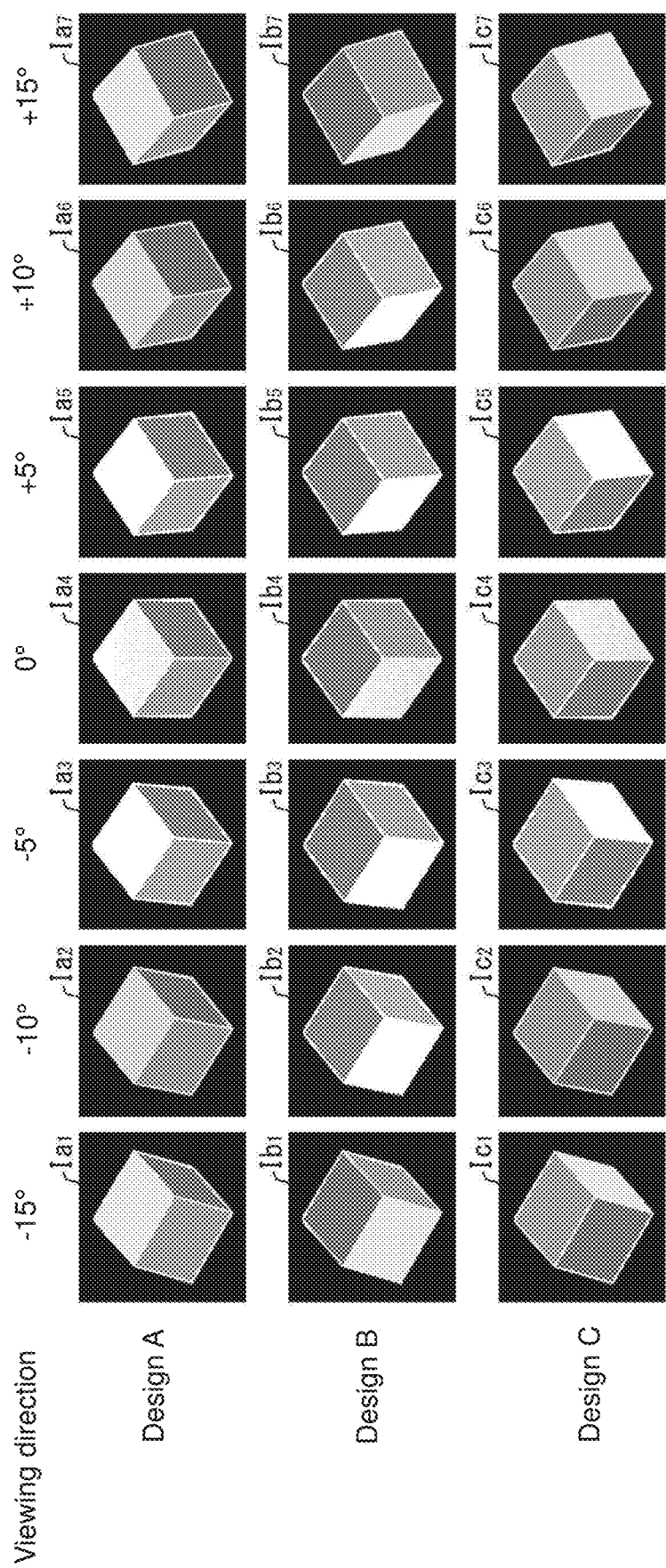
FIG. 7 is a diagram illustrating the relationship between a direction in which a user views a light guide plate and a stereoscopic image viewed by the user according to one or more embodiments.
Figure 8:
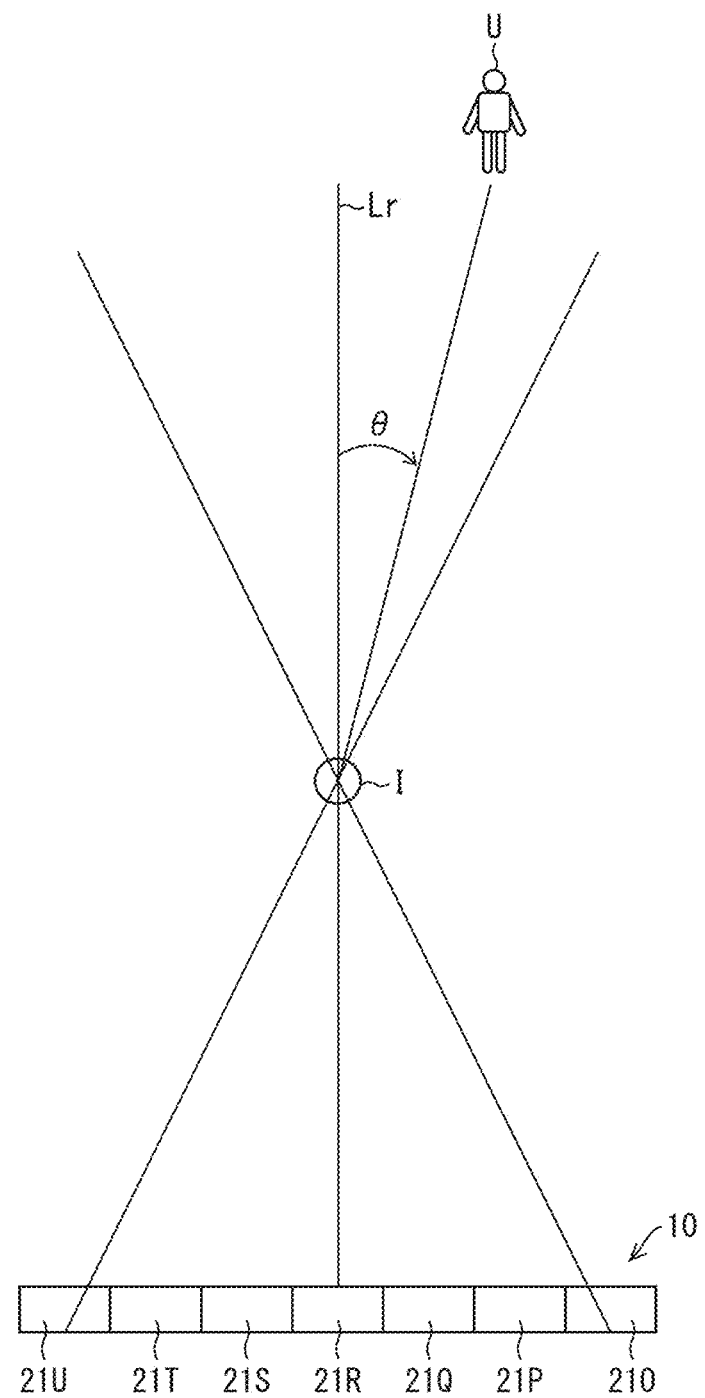
FIG. 8 is a diagram illustrating a relationship between a direction in which a user views a light guide plate and the light guide plate according to one or more embodiments.

FIG. 7 is a diagram showing the relationship between the viewing direction and a stereoscopic image I viewed by the user. FIG. 8 is a diagram showing the relationship between the viewing direction and the light guide plate 10.

As shown in FIG. 8, the viewing direction is represented by an angle θ with a direction (reference direction) Lr in which a user U views the light guide plate 10 directly from the front. The above angle has a negative value when the viewing direction is changed in the positive x-direction with respect to the reference direction Lr, and has a positive value when the viewing direction is changed in the negative x-direction with respect to the reference direction Lr.

As shown in the upper part of FIG. 7, the optical path deflectors 21 are arranged to allow a stereoscopic image Ia of a design A representing a cube (object) to appear differently in accordance with the viewing direction θ. However, the luminance levels of the surfaces of the stereoscopic image Ia do not change greatly when viewed in different viewing directions.

Thus, in the present embodiment or embodiments, a stereoscopic image Ib of a design B and a stereoscopic image Ic of a design C are first prepared as shown in the middle part and the lower part of FIG. 7. The stereoscopic images Ib and Ic are the same as the stereoscopic image Ia except that the luminance levels of the surfaces are discretely different from the luminance levels of the surfaces of the stereoscopic image Ia.

Optical path deflectors 21O and 21P (first optical deflectors) that cause light to be emitted in viewing directions θ between −17.5° inclusive and −7.5° exclusive (a first angle range) are then arranged to allow stereoscopic images Ia1 and Ia2 (first stereoscopic images) to be formed. Optical path deflectors 21Q to 21S (second optical deflectors) that cause light to be emitted in viewing directions θ between −7.5° inclusive and 7.5° exclusive (a second angle range adjacent to the first angle range) are arranged to allow stereoscopic images Ib3 to Ib5 (second stereoscopic images) to be formed. Optical path deflectors 21T and 21U (third optical deflectors) that cause light to be emitted in viewing directions θ between 7.5° inclusive and 17.5° exclusive (a third angle range adjacent to the second angle range) are then arranged to allow stereoscopic images Ic6 and Ic7 (third stereoscopic images) to be formed.

Figure 9:
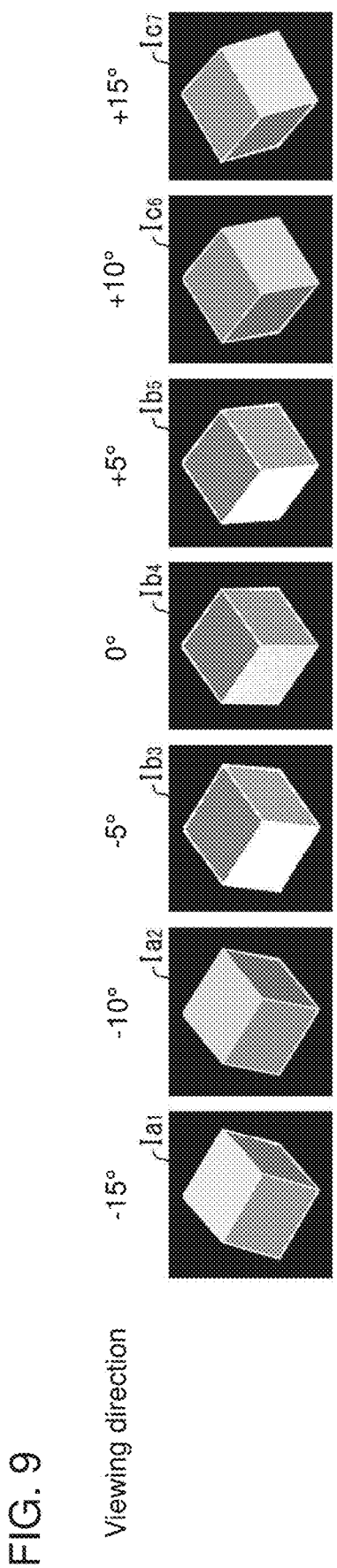
FIG. 9 is a diagram illustrating a relationship between a stereoscopic image viewed by a user with a light guide plate and a direction in which the user views the light guide plate according to one or more embodiments.
Figure 10:
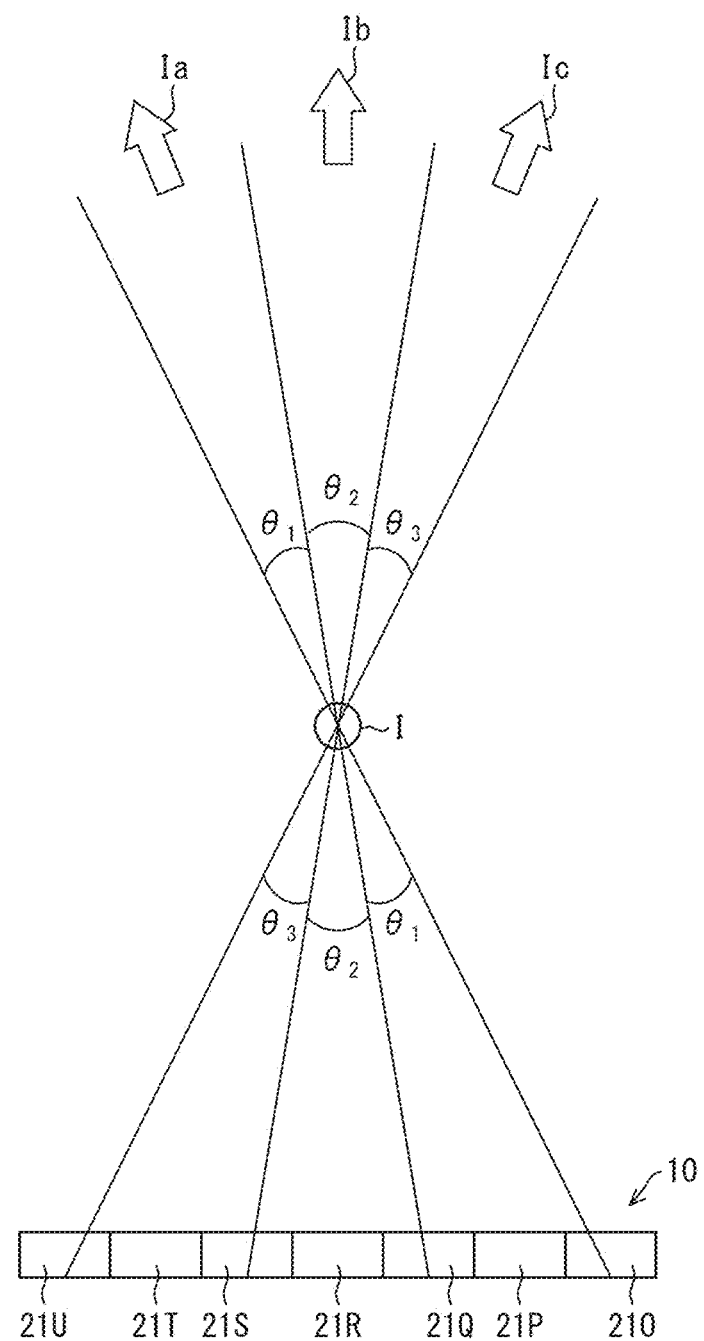
FIG. 10 is a diagram illustrating a display pattern for a stereoscopic image according to one or more embodiments.

FIG. 9 is a diagram showing the relationship between the stereoscopic image I viewed by the user with the light guide plate 10 according to the present embodiment or embodiments and the viewing direction θ. FIG. 10 is a diagram showing a display pattern for the above stereoscopic image.

As shown in FIGS. 9 and 10, when the viewing direction θ is within a range θ1 between −17.5° inclusive and −7.5° exclusive, the user views the stereoscopic image Ia (Ia1 and Ia2). For the viewing direction θ across a boundary of −7.5°, the stereoscopic image Ia (Ia2) changes to the stereoscopic image Ib (Ib3). A discrete change then occurs between the luminance of the surfaces (first surfaces) of the stereoscopic image Ia and the luminance of the corresponding surfaces (second surfaces) of the stereoscopic image Ib.

For the viewing direction θ within a range θ2 between −7.5° inclusive and 7.5° exclusive, the user views the stereoscopic image Ib (Ib3 to Ib5). For the viewing direction θ across a boundary of 7.5°, the stereoscopic image Ib (Ib5) changes to the stereoscopic image Ic (Ic6). A discrete change then occurs between the luminance of the surfaces of the stereoscopic image Ib and the luminance of the corresponding surfaces of the stereoscopic image Ic. For the viewing direction θ within a range θ3 between 7.5° inclusive and 17.5° exclusive, the user views the stereoscopic image Ic (Ic6 and Ic7).

The luminance levels of portions of the stereoscopic image I can thus be changed in accordance with the user's viewing direction θ allowing the stereoscopic image I to appear properly.

APPENDIX

In the present embodiment or embodiments, the stereoscopic image Ia of the design A is viewable in the viewing direction within a range of 10°, the stereoscopic image Ib of the design B is viewable in the viewing direction within a range of 15°, and the stereoscopic image Ic of the design C is viewable in the viewing direction within a range of 10°. However, the ranges are not limited to the above examples.

For example, the above three ranges may have the same value of, for example, 10.6°. The above three ranges may be less than or equal to 15°. With the ranges of greater than 15°, the stereoscopic image I does not change in design unless the user changes the viewing direction greatly.

Example

Figure 11:
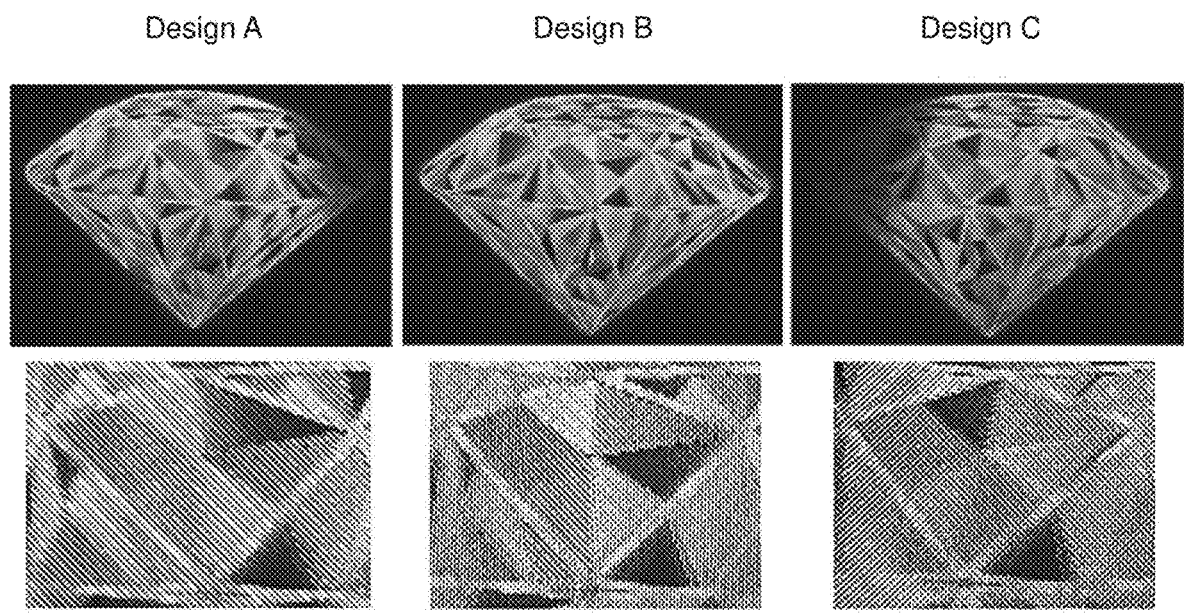
FIG. 11 is a diagram illustrating stereoscopic images of three different designs for a diamond in an example according to one or more embodiments.

FIG. 11 is a diagram showing stereoscopic images I of three different designs for a diamond in an example. The lower part of FIG. 11 shows enlarged views of the same portions of each stereoscopic image I shown in the upper part. FIG. 11 shows that the luminance levels of many portions of the stereoscopic image I change in accordance with the user' viewing direction θ.

Second Embodiment

Another embodiment will now be described. For ease of explanation, the components having the same functions as the components described in the above embodiments are given the same reference numerals as those components, and will not be described repeatedly. The same applies to other embodiments described later.

Figure 12:
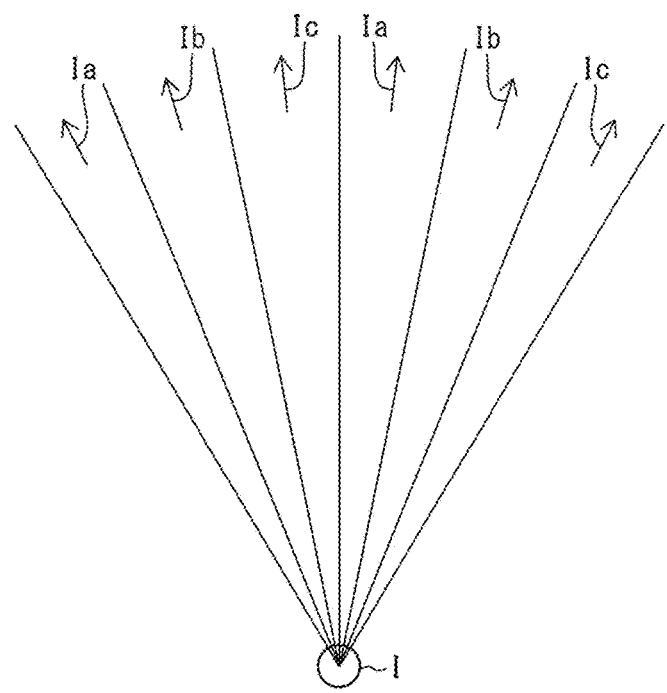
FIG. 12 is a diagram illustrating a display pattern for a stereoscopic image viewed by a user with a light guide plate according to one or more embodiments.

FIG. 12 is a diagram showing a display pattern for a stereoscopic image I viewed by a user with the light guide plate 10 according to the present embodiment or embodiments. The light guide plate 10 according to the present embodiment or embodiments is the same as the light guide plate 10 shown in FIGS. 1 to 10 except that the display pattern is different.

As shown in FIG. 12, in the present embodiment or embodiments, the stereoscopic images Ia, Ib, and Ic of the three designs shown in FIG. 7 cyclically change between one another in accordance with the viewing direction. In the present embodiment or embodiments, the stereoscopic images Ia, Ib, and Ic each are viewable in the viewing direction within a range of 5.4°. The narrower range allows the luminance levels of portions of the stereoscopic image I to change more frequently.

The above range may be greater than or equal to 5°. With the above range of less than 5°, the right eye and the left eye of the user are more likely to view different designs of the stereoscopic image I.

Third Embodiment

Still another embodiment will now be described.

Figure 13:
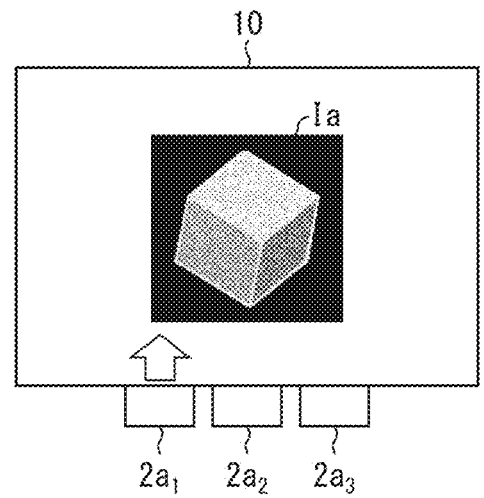
FIG. 13 is a diagram illustrating a plan view of stereoscopic images displayed by a light guide plate according to one or more embodiments.
Figure 13:
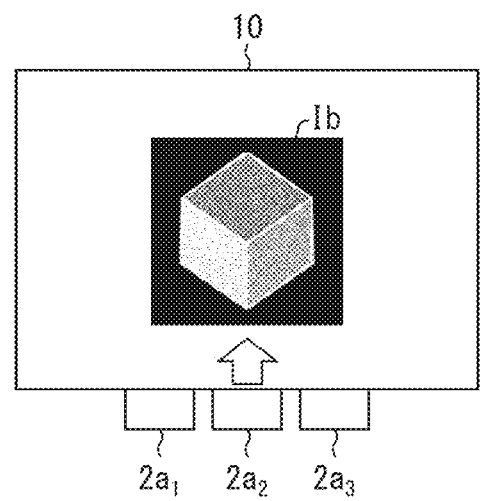
Figure 13:
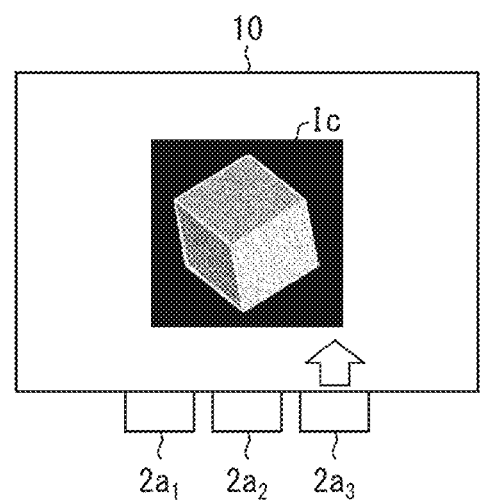

FIG. 13 is a plan view of stereoscopic images I displayed by a light guide plate 10 according to the present embodiment or embodiments. As shown in FIG. 13, in the present embodiment or embodiments, the optical path deflectors 21 are arranged to cause light emitted from each of three LEDs 2a1 to 2a3 to form the corresponding stereoscopic images Ia to Ic of the designs A to C shown in FIG. 7.

In the above structure, as shown in the upper part of FIG. 13, the stereoscopic image Ia of the design A appears with light from the LED 2a1 (first light) when the LED 2a1 is turned on and the LEDs 2a2 and 2a3 are turned off. As shown in the middle part of FIG. 13, the stereoscopic image Ib of the design B appears with light from the LED 2a2 (second light) when the LED 2a2 is turned on and the LEDs 2a1 and 2a3 are turned off. As shown in the lower part of FIG. 13, the stereoscopic image Ic of the design C appears when the LED 2a3 is turned on and the LEDs 2a1 and 2a2 are turned off.

Thus, switching between light from the LED 2a1 and light from the LED 2a2 causes a discrete change between the luminance of portions of the stereoscopic image Ia and the luminance of the corresponding portions of the stereoscopic image Ib. Thus, the surfaces of the stereoscopic image I can have discretely different luminance levels with the on-state of the LEDs 2a1 to 2a3 being sequentially switched, without the user's viewing direction being changed allowing the stereoscopic image I to appear properly.

Fourth Embodiment

Still another embodiment will now be described.

A light guide plate 10 according to the present embodiment or embodiments has optical path deflectors 21 that cause light emitted from the LED 2a1 shown in FIG. 13 to form a stereoscopic image I with the display pattern shown in FIG. 10 and light emitted from the LED 2a2 shown in FIG. 13 to form the stereoscopic image I with the display pattern shown in FIG. 12.

More specifically, light emitted from the LED 2a1 shown in FIG. 13 (first light) is emitted within the first angle range θ1 shown in FIG. 10 to cause the stereoscopic image Ia (first stereoscopic image) to appear in a space, and the first light is emitted within the second angle range θ2 adjacent to the first angle range θ1 to cause the stereoscopic image Ib (third stereoscopic image) to appear at the same position as the stereoscopic image Ia. Across the boundary between the first angle range θ1 and the second angle range θ2, a discrete change occurs between the luminance of portions of the stereoscopic image Ia and the luminance of the corresponding portions of the stereoscopic image Ib.

Light emitted from the LED 2a2 shown in FIG. 13 (second light) is emitted within an angle range shown in FIG. 12 (third angle range) to cause the stereoscopic image Ia (second stereoscopic image) to appear in a space, and the second light is emitted within an angle range (fourth angle range) adjacent to the angle range to cause the stereoscopic image Ib (fourth stereoscopic image) to appear at the same position as the stereoscopic image Ia. Across the boundary between the two angle ranges, a discrete change occurs between the luminance of portions of the stereoscopic image Ia and the luminance of the corresponding portions of the stereoscopic image Ib.

In the above structure, switching the on-state of the LEDs 2a changes the display pattern.

Applicability to Display Device, Input Device, Amusement Apparatus, and Other Apparatuses A display device including the light guide plate 10 according to one or more embodiments and a light source (e.g., an LED) that emits light incident on the light guide plate 10 also falls within the technical scope.

An input device including the display device and a sensor 50 (refer to FIG. 1) that is near a stereoscopic image I formed in a space or that detects an object (e.g., a human digit) near the stereoscopic image I also falls within the technical scope. The sensor 50 may be a known sensor such as a limited reflective sensor that detects an object at a predetermined detection position.

An apparatus of any type including the display device also falls within the technical scope. Examples of such an apparatus include amusement apparatuses (pachinko machines, slot machines, and other devices and machines used in, for example, amusement arcades and casinos), toys, in-vehicle devices, and consumer electronics.

The embodiments disclosed herein should not be construed to be restrictive, but may be modified within the spirit and scope of the claimed disclosure. The technical features disclosed in different embodiments may be combined in other embodiments within the technical scope.

For example, although the luminance levels of the surfaces of a cube are discretely changed in the above embodiments, the luminance levels of the sides of a cube may be changed discretely. More specifically, the luminance level of a side (a first line) of the stereoscopic image Ia may be discretely different from the luminance level of the corresponding side (second line) of the stereoscopic image Ib. In the above described manner, the luminance level of an intended portion of a stereoscopic image I can be changed discretely.

Although the three designs A to C are used in the above embodiments, four or more or two designs may be used.

The invention claimed is:

1. A light guide plate, comprising:
a first optical deflector configured to guide incident light to be emitted within a first angle range to display a first stereoscopic image representing an object as a real image or a virtual image in a space; and
a second optical deflector configured to guide incident light to be emitted within a second angle range adjacent to the first angle range to display a second stereoscopic image representing the object at a same position as the first stereoscopic image, wherein
across a boundary between the first angle range and the second angle range, a discrete change occurs between luminance of a portion of the first stereoscopic image and luminance of a portion of the second stereoscopic image corresponding to the portion of the first stereoscopic image.

2. The light guide plate according to claim 1, wherein
across the boundary between the first angle range and the second angle range, a discrete change occurs between luminance of a first surface in the first stereoscopic image and luminance of a second surface in the second stereoscopic image corresponding to the first surface in the first stereoscopic image.

3. The light guide plate according to claim 2, wherein
across the boundary between the first angle range and the second angle range, a discrete change occurs between luminance of a first line in the first stereoscopic image and luminance of a second line in the second stereoscopic image corresponding to the first line in the first stereoscopic image.

4. The light guide plate according to claim 2, further comprising:
a plurality of third optical deflectors configured to guide incident light to be emitted within a third angle range adjacent to the second angle range to display a third stereoscopic image representing the object at a same position as the first stereoscopic image, wherein
across a boundary between the second angle range and the third angle range, a discrete change occurs between luminance of a portion of the second stereoscopic image and luminance of a portion of the third stereoscopic image corresponding to the portion of the second stereoscopic image, and
the second angle range is greater than or equal to 5°.

5. The light guide plate according to claim 2, further comprising:
a plurality of third optical deflectors configured to guide incident light to be emitted within a third angle range adjacent to the second angle range to display a third stereoscopic image representing the object at a same position as the first stereoscopic image, wherein
across a boundary between the second angle range and the third angle range, a discrete change occurs between luminance of a portion of the second stereoscopic image and luminance of a portion of the third stereoscopic image corresponding to the portion of the second stereoscopic image, and
the second angle range is less than or equal to 15°.

6. A display device, comprising:
the light guide plate according to claim 2; and
a light source configured to emit light to be incident on the light guide plate.

7. The light guide plate according to claim 1, wherein
across the boundary between the first angle range and the second angle range, a discrete change occurs between luminance of a first line in the first stereoscopic image and luminance of a second line in the second stereoscopic image corresponding to the first line in the first stereoscopic image.

8. The light guide plate according to claim 7, further comprising:
a plurality of third optical deflectors configured to guide incident light to be emitted within a third angle range adjacent to the second angle range to display a third stereoscopic image representing the object at a same position as the first stereoscopic image, wherein
across a boundary between the second angle range and the third angle range, a discrete change occurs between luminance of a portion of the second stereoscopic image and luminance of a portion of the third stereoscopic image corresponding to the portion of the second stereoscopic image, and
the second angle range is greater than or equal to 5°.

9. The light guide plate according to claim 7, further comprising:
a plurality of third optical deflectors configured to guide incident light to be emitted within a third angle range adjacent to the second angle range to display a third stereoscopic image representing the object at a same position as the first stereoscopic image, wherein
across a boundary between the second angle range and the third angle range, a discrete change occurs between luminance of a portion of the second stereoscopic image and luminance of a portion of the third stereoscopic image corresponding to the portion of the second stereoscopic image, and
the second angle range is less than or equal to 15°.

10. The light guide plate according to claim 1, further comprising:
a plurality of third optical deflectors configured to guide incident light to be emitted within a third angle range adjacent to the second angle range to display a third stereoscopic image representing the object at a same position as the first stereoscopic image, wherein
across a boundary between the second angle range and the third angle range, a discrete change occurs between luminance of a portion of the second stereoscopic image and luminance of a portion of the third stereoscopic image corresponding to the portion of the second stereoscopic image, and
the second angle range is greater than or equal to 5°.

11. A display device, comprising:
the light guide plate according to claim 7; and
a light source configured to emit light to be incident on the light guide plate.

12. A display device, comprising:
the light guide plate according to claim 10; and
a light source configured to emit light to be incident on the light guide plate.

13. The light guide plate according to claim 1, further comprising:
a plurality of third optical deflectors configured to guide incident light to be emitted within a third angle range adjacent to the second angle range to display a third stereoscopic image representing the object at a same position as the first stereoscopic image, wherein
across a boundary between the second angle range and the third angle range, a discrete change occurs between luminance of a portion of the second stereoscopic image and luminance of a portion of the third stereoscopic image corresponding to the portion of the second stereoscopic image, and
the second angle range is less than or equal to 15°.

14. A display device, comprising:
the light guide plate according to claim 13; and
a light source configured to emit light to be incident on the light guide plate.

15. A display device, comprising:
the light guide plate according to claim 1; and
a light source configured to emit light to be incident on the light guide plate.

16. An input device, comprising:
the display device according to claim 15; and
a sensor configured to detect an object.

17. An apparatus, comprising:
the display device according to claim 15.

18. A light guide plate, comprising:
a first optical deflector configured to guide incident first light to be emitted to display a first stereoscopic image representing an object as a real image or a virtual image in a space; and
a second optical deflector configured to guide second light incident at a position different from a position at which the first light is incident to be emitted to display a second stereoscopic image representing the object at a same position as the first stereoscopic image, wherein
upon switching between the first light and the second light, a discrete change occurs between luminance of a portion of the first stereoscopic image and luminance of a portion of the second stereoscopic image corresponding to the portion of the first stereoscopic image.

19. The light guide plate according to claim 18, wherein
the first optical deflector causes the first light to be emitted within a first angle range to display a first stereoscopic image in a space and causes the first light to be emitted within a second angle range adjacent to the first angle range to display a third stereoscopic image representing the object at a same position as the first stereoscopic image,
the second optical deflector causes the second light to be emitted within a third angle range to display a second stereoscopic image in a space and causes the second light to be emitted within a fourth angle range adjacent to the third angle range to display a fourth stereoscopic image representing the object at a same position as the second stereoscopic image,
across a boundary between the first angle range and the second angle range, a discrete change occurs between luminance of a portion of the first stereoscopic image and luminance of a portion of the third stereoscopic image corresponding to the portion of the first stereoscopic image, and
across a boundary between the third angle range and the fourth angle range, a discrete change occurs between luminance of a portion of the second stereoscopic image and luminance of a portion of the fourth stereoscopic image corresponding to the portion of the second stereoscopic image.

20. A display device, comprising:
the light guide plate according to claim 18; and
a light source configured to emit light to be incident on the light guide plate.

* * * * *